(12) United States Patent
Depp et al.

(10) Patent No.: US 6,570,088 B1
(45) Date of Patent: May 27, 2003

(54) JUNCTION BOX ASSEMBLY

(75) Inventors: Charles Depp, Saline, MI (US); Bennie Malcom, Detroit, MI (US)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/097,228

(22) Filed: Mar. 13, 2002

(51) Int. Cl.[7] .............................................. H02G 3/08
(52) U.S. Cl. ....................... 174/50; 174/59; 174/52.1; 439/76.2; 439/621
(58) Field of Search ...................... 174/50, 52.1, 52.4, 174/59, 60, 61, 54, 58, 251, 254, 255, 71 B; 439/949, 76.1, 76.2, 402, 364, 553, 701, 622, 621, 461, 611, 612; 361/641, 644

(56) References Cited

U.S. PATENT DOCUMENTS

| | | | |
|---|---|---|---|
| 4,629,351 A | | 12/1986 | Kato et al. |
| 4,959,018 A | * | 9/1990 | Yamamoto et al. ......... 174/52.1 |
| 5,023,752 A | * | 6/1991 | Detter et al. ................. 361/646 |
| 5,067,905 A | * | 11/1991 | Matsumoto et al. ....... 439/76.2 |
| 5,271,689 A | | 12/1993 | Ishii et al. |
| 5,515,988 A | * | 5/1996 | Oda ............................. 220/3.8 |
| 5,680,088 A | * | 10/1997 | Seki et al. .................... 337/194 |
| 5,700,165 A | * | 12/1997 | Harris et al. ................. 439/621 |
| 5,702,021 A | * | 12/1997 | Ito ............................... 220/284 |
| 5,718,598 A | * | 2/1998 | Saka et al. ................... 439/404 |
| 5,748,068 A | * | 5/1998 | Kiyota ......................... 337/186 |
| 5,755,579 A | * | 5/1998 | Yanase et al. .............. 439/76.2 |
| 5,795,193 A | * | 8/1998 | Yang ............................ 439/621 |
| 5,820,413 A | * | 10/1998 | Yamada et al. .............. 439/621 |
| 5,822,189 A | * | 10/1998 | Isshiki .......................... 174/59 |
| 5,915,978 A | * | 6/1999 | Hayakawa et al. .......... 439/621 |
| 5,995,380 A | * | 11/1999 | Maue et al. ................. 174/254 |
| 6,022,247 A | * | 2/2000 | Akiyama et al. ............ 439/949 |
| 6,030,257 A | | 2/2000 | Furuya |
| 6,077,102 A | * | 6/2000 | Borzi et al. ................. 439/76.2 |
| 6,121,548 A | * | 9/2000 | Matsuoka ..................... 174/59 |
| 6,126,458 A | * | 10/2000 | Gregory et al. ............. 439/76.2 |
| 6,194,656 B1 | * | 2/2001 | Kondo et al. ................ 174/251 |
| 6,270,359 B1 | * | 8/2001 | Kondo et al. ............... 439/76.2 |
| 6,322,376 B1 | * | 11/2001 | Jetton .......................... 439/76.2 |
| 6,325,640 B1 | * | 12/2001 | Kasai ......................... 174/71 B |

FOREIGN PATENT DOCUMENTS

| | | |
|---|---|---|
| JP | 7-192791 | 7/1995 |
| JP | 8-264102 | 10/1996 |
| JP | 10-223315 | 8/1998 |
| JP | 10-290077 | 10/1998 |
| JP | 2001-331727 | 11/2000 |

* cited by examiner

*Primary Examiner*—Chau N. Nguyen
*Assistant Examiner*—Angel R. Estrada
(74) *Attorney, Agent, or Firm*—Harness, Dickey & Pierce, P.L.C.

(57) ABSTRACT

An improved junction box assembly having a shroud and a junction box. The junction box assembly includes a plurality of tapered alignment tabs which permit the shroud and the junction box to be highly skewed to each other during the initial phases of their assembly. The junction box includes cue members for providing a visual indication that the contacts that extend from the junction box have been engaged in a reliable manner to the contacts in the wire harnesses that are coupled to the shroud. A clip structure is provided to permit an electrical component, such as a terminal fuse, to be loosely coupled to the terminals of the junction box prior to the assembly of the junction box to the shroud. The junction box is configured with a plurality of abutting walls that are located proximate the terminals wherein the abutting walls inhibit relative rotation between the junction box and a terminal connector of the cable.

20 Claims, 9 Drawing Sheets

JUNCTION BOX ASSEMBLY

FIELD OF THE INVENTION

The present invention generally relates vehicle electrical systems and more particularly to an improved junction box assembly.

BACKGROUND OF THE INVENTION

Modern vehicle electrical systems commonly employ junction box assemblies for distributing electric power between various wiring harnesses and electronic components, such as relays, microprocessors, diodes, transistors, capacitors, fuses and the like. Junction box assemblies are typically constructed so as to include a shroud for housing the connector ends of a plurality of wire harnesses, a junction box with a plurality of electrical terminals for electrically coupling the wire harnesses and electronic components, and a cover portion that substantially covers the base to inhibit water or other contaminants from contacting the electrical terminals and conducting electric power in an undesired manner. Despite the relatively widespread use of such junction box assemblies, the prior art junction box assemblies are known to have several drawbacks.

These drawbacks generally tend to be associated with the process of installing the junction box assemblies into vehicle in relatively high-volume, short cycle-time production lines. Modern high-volume vehicle manufacturing techniques favor the delivery of highly assembled modules or components to the vehicle assembly line so as to facilitate the efficient and reliable assembly of vehicles. In this regard, it is desired that all of the electrical components (e.g., fuses and relays) of the junction box assembly be secured such that they will not dislodge during transport and installation. Most of the various electrical components are configured to fit into recesses and positively engage electric terminals in the junction box and as such, there is little risk that these components will dislodge. Modern terminal fuses, however, are typically installed over the terminals of the junction box and are not typically fixed to the junction box until the cables (e.g., battery cables) have been coupled to the terminals. Accordingly, the installation of bladed terminal fuses to a junction box prior to the installation of the junction box to the vehicle has not been encouraged due to the relatively high risk that the terminal fuse will dislodge during transport and installation operations.

Another drawback relates to the coupling of cables to the various terminals. The known junction boxes are constructed such that the cables can rotate relative to the junction box when the cables are being secured to the terminals. Rotation of the cables relative to the junction box often shifts the cable into an undesired orientation that tends to stress the connection between the wires of the cable and the connector end.

A further drawback of the known junction box assemblies concerns the mating of the junction box to the shroud. Typically, snap-fittings, such as retaining tabs and retaining slots, are employed to fixedly but releasably couple the junction box and the shroud. The snap-fittings, however, are constructed such that the shroud and the junction box must be closely aligned to one another and all or a substantial portion of the retaining tabs engaged to the retaining slots simultaneously. Often times, however, assemblers find it relatively difficult to precisely align the shroud and the junction box such that all or a substantial portion of the retaining tabs engaged to the retaining slots simultaneously.

Yet another drawback relates to the coupling of the junction box to the wire harnesses that are disposed in the shroud. Modern junction box assemblies are typically configured such that the electrical contacts that extend from the junction box will engage mating electrical contacts in the connector end of the wire harnesses when the junction box and shroud are slid together. Unfortunately, junction boxes tend to be somewhat flexible and can bend when the contacts of the junction box and wire harnesses contact one another to thereby provide no electrical contact or an unreliable electrical contact therebetween. Some junction box assembly designs utilize threaded fasteners to draw the connector end and the junction box together to thereby promote the engagement of the electrical contacts. In some cases, however, the clamping force that is produced by the threaded fastener is insufficient to force the electrical contacts into engagement despite having tightened the fastener to a desired torque level.

Accordingly, there remains a need in the art for an improved junction box assembly that overcomes these and other drawbacks.

SUMMARY OF THE INVENTION

In one preferred form, the present invention provides a junction box assembly having a shroud, a junction box, a plurality of tab receiving slots and a plurality of alignment tabs. The junction box is configured to be received at least partially into the shroud. The tab receiving slots are formed into one of the shroud and the junction box. Each of the tab receiving slots defines an aperture with having a T-shaped cross section in a direction taken perpendicular to a longitudinal axis of the aperture. The alignment tabs are coupled to the other one of the shroud and the junction box and have a longitudinal axis, a stem and a flange. The stem and the flange are arranged such that a cross section taken through the alignment tab in a direction perpendicular to the longitudinal axis of the alignment tab is generally T-shaped and sized to fit in the aperture of a corresponding one of the tab receiving slots. The flange is tapered over at least one half of its length.

In another preferred form, the present invention provides an electrical junction box assembly having a junction box housing, a pair of terminals, a fuse and a clip structure. The terminals are coupled to the junction box housing and extend therefrom. Each of the terminals has a terminal post that is adapted for electrical connection to an associated cable assembly. The fuse is disposed over the terminals and is not fixedly coupled thereto. The fuse is configured to electrically couple the terminals when the cable assemblies are secured to the terminals. The clip structure is coupled to the junction box housing and engages the fuse to inhibit the fuse from disengaging the terminals when the cable assemblies are not coupled to the terminal posts.

In yet another preferred form, the present invention provides a junction box assembly having a shroud and a junction box. The shroud is configured for housing an end connector of a wire harness. The junction box is configured to be releasably coupled to the shroud and includes a junction box housing, a plurality of electrical contacts and a cue member. The junction box housing has a first side and a second side opposite the first side. The electrical contacts extending outwardly from the first side and are configured to engage a plurality of mating electrical contacts in the connector end. The electrical contacts are configured to be slidable relative to the mating electrical contacts between a disengaged condition and an engaged condition. The cue member is disposed in the junction box housing and slidable between a first condition and a second condition. The cue member slides from the first condition to the second condition in response to movement of the electrical contacts from the disengaged condition to the engaged condition such that the cue member extends outwardly from the second side to provide a visual indication of an electrical connection between the connector end and the junction box when the electrical contacts are in the engaged condition.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
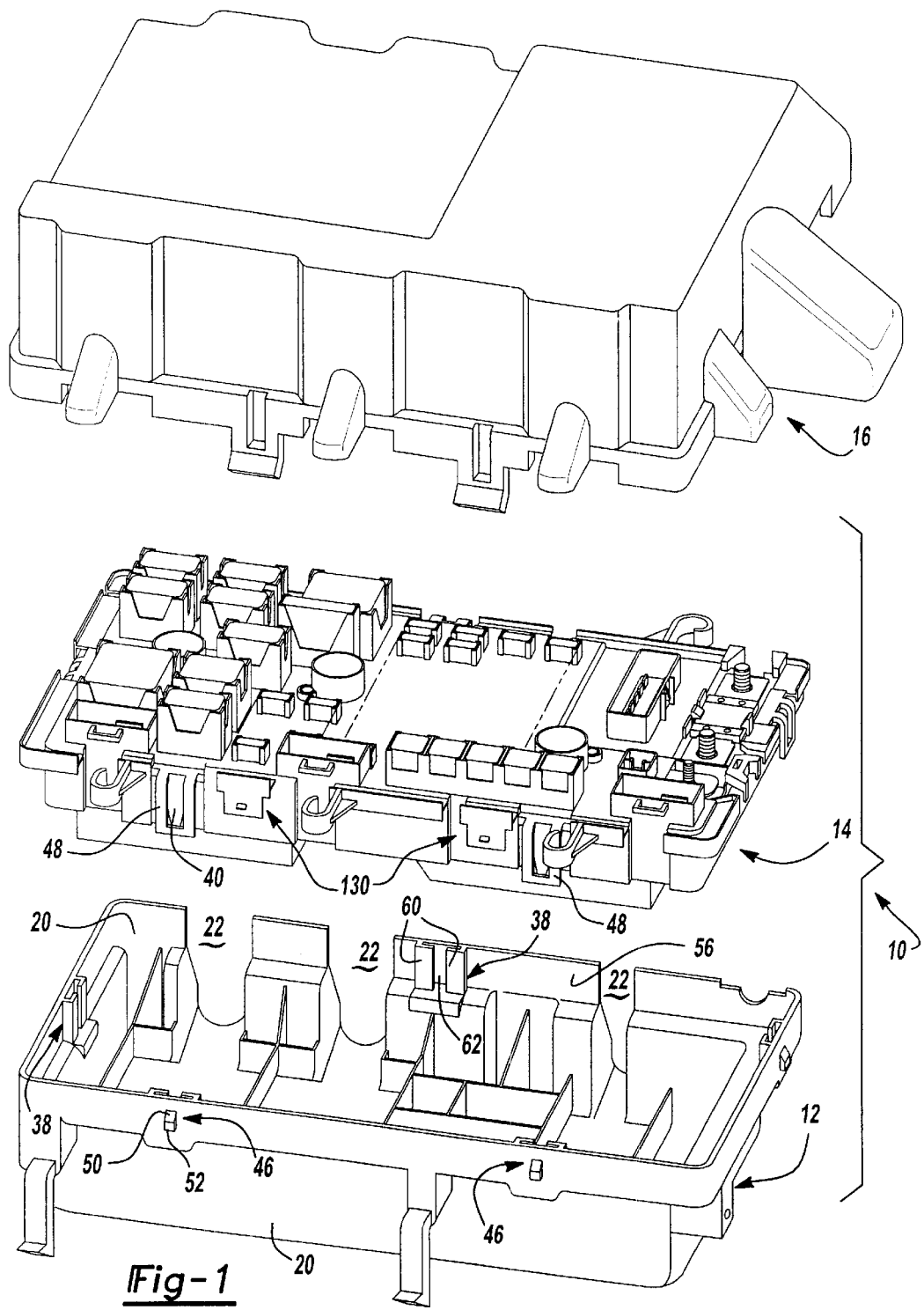
FIG. 1 is an exploded perspective view of a junction box assembly constructed in accordance with the teachings of the present invention.

With reference to FIG. 1 of the drawings, a junction box assembly constructed in accordance with the teachings of the present invention is generally indicated by reference numeral 10. The junction box assembly 10 is illustrated to be of a modular "plug-in" design having a lower housing or shroud 12, a junction box 14 and an upper shroud or cover 16, which is employed to cover the shroud 12 and the junction box 14 once the shroud 12 and the junction box 14 have been coupled to one another.

Figure 2:
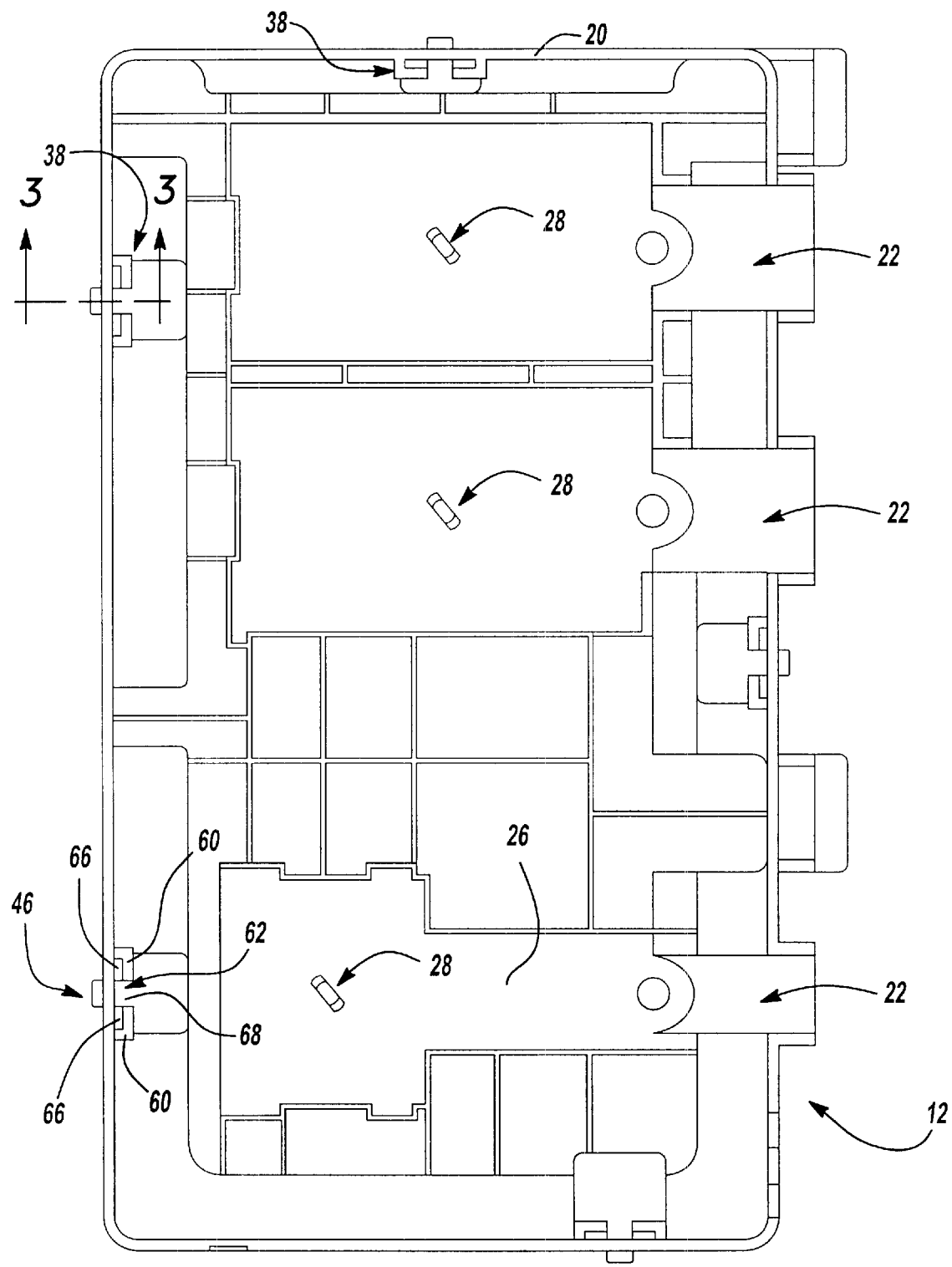
FIG. 2 is a top view of a portion of the junction box assembly illustrating the shroud in greater detail.
Figure 3:
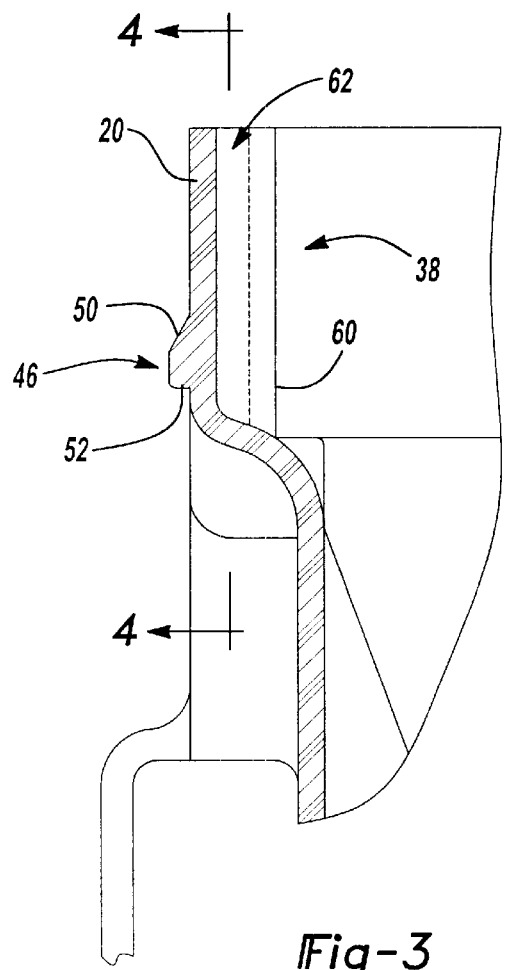
FIG. 3 is a sectional view of a portion of the junction box assembly of FIG. 1 taken along the line 3—3 of FIG. 2 and illustrating a tab retaining slot formed into the shroud.
Figure 4:
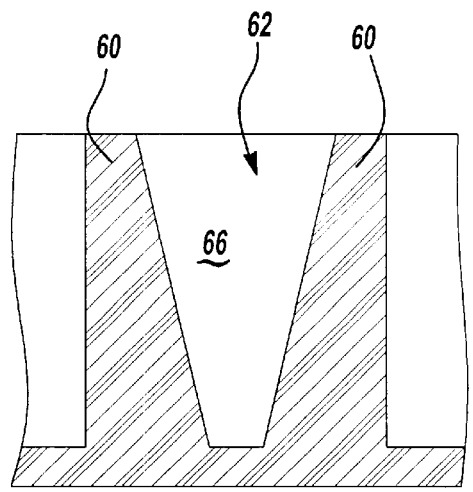
FIG. 4 is a sectional view taken along the line 4—4 of FIG. 3.

With additional reference to FIG. 2, the shroud 12 is a container-like structure having a plurality of sidewalls 20 into which a plurality of slotted wire harness apertures 22 are formed. Each of the wire harness apertures 22 is configured to receive an associated wire harness 24 (FIG. 12). With additional reference to FIGS. 11 through 13, the bottom surface 26 of the shroud 12 includes a plurality of wire harness retaining tabs 28 that are configured to cooperate with the connector end 30 of each associated wire harness 24 to fixedly couple the connector end 30 to the shroud 12 such that a plurality of electrical contacts 32 in the connector end 30 are oriented in a predetermined manner relative to the shroud 12. The sidewalls 20 define a cavity 34 that is configured to receive at least a portion of the junction box 14 to permit a plurality of electrical contacts 36 that extend from the junction box 14 to be electrically coupled to the connector end 30 of the wire harness 24.

With reference to FIGS. 1 through 4, the shroud 12 and the junction box 14 are configured to engage one another in a snap-fit manner. In this regard, the shroud 12 includes a plurality of tab receiving slots 38 and the junction box 14 includes a plurality of alignment tabs 40, although those skilled in the art will readily understand that the location of the slots and tabs may be reversed (i.e., the tab receiving slots 38 may be coupled to the junction box 14). The shroud 12 also includes a plurality of retaining tabs 46 which, in the embodiment illustrated, are shown to be located proximate the tab receiving slots 38. The retaining tabs 46 are configured to engage an associated U-shaped latch member 48 that is formed onto the junction box 14. The retaining tabs 46 conventionally include a tapered edge 50 and end abruptly at an abutting face 52.

The tab receiving slots 38 are coupled to the interior side 56 of the sidewalls 20 and are shown to have a pair of spaced apart legs 60 that define a C-shaped channel with a tab aperture 62. The legs 60 extend perpendicularly from the sidewall 20 into the cavity 34 and turn abruptly toward one another. The tab aperture 62 has a generally T-shaped cross section, having a first portion 66 that is parallel to the sidewall 20 and a second portion 68 that is generally perpendicular to the sidewall 20. In the particular embodiment illustrated, the cross section of the tab aperture 62 is configured to conform to the shape of the alignment tab 40, but those skilled in the art will understand that the tab aperture 62 may also be configured with a constant cross section that conforms to the maximum width of the alignment tab 40.

Figure 5:
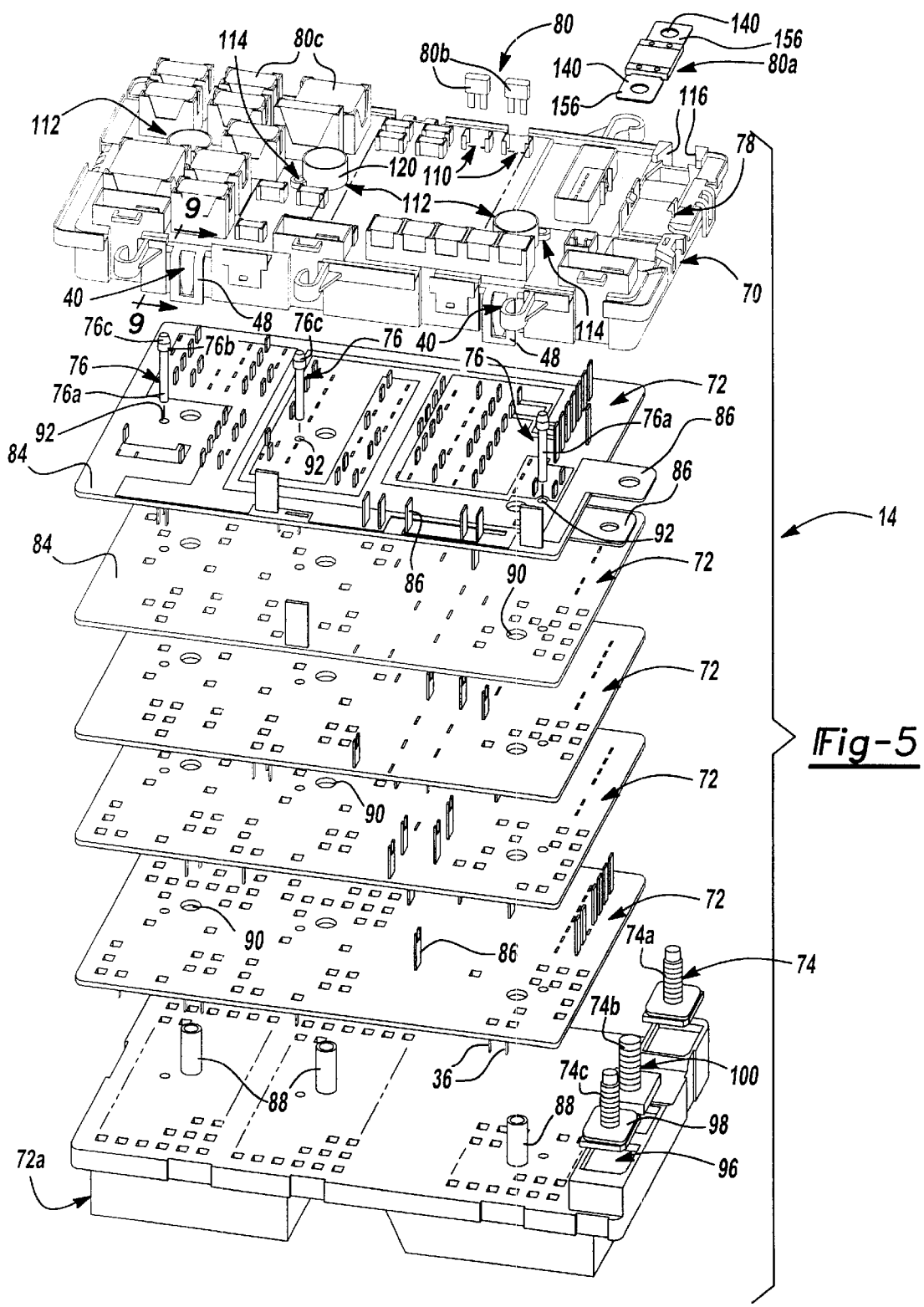
FIG. 5 is an exploded perspective view of a portion of the junction box assembly of FIG. 1 illustrating the junction box in greater detail.

In FIG. 5, the junction box 14 is illustrated to include a junction box housing 70, a plurality of circuit boards 72, a plurality of terminals 74, a plurality of cue members 76, a clip structure 78 and a plurality of electrical components 80 that include, for example, a terminal fuse 80a, fuses 80b and relays 80c. The basic construction of the circuit boards 72 and their coupling to the junction box housing 70 is conventional and as such, a detailed discussion of their construction is not needed, as this is well within the capabilities of one skilled in the art. Briefly, each of the circuit boards 72 include a board member 84, which is constructed from an electrically insulating material, and a plurality of electrical contacts 86 that are configured to distribute electrical power through the circuit board 72 and/or between circuit boards 72 in a predetermined manner. Several of the electrical contacts 86 extend below the circuit board 72a and form the electrical contacts 36 that are to be electrically coupled to the connector end 30 of the wire harness 24. The engagement of the electrical contacts 86 into the adjacent circuit boards 72 produces a locking effect which tends to inhibit the circuit boards 72 from moving relative to one another. Further, the circuit board 72a includes a plurality of upwardly protruding bosses 88 that are configured to fit through apertures 90 that are formed through the other circuit boards 72 and engage the other circuit boards 72 in a slip fit manner.

One difference between the circuit boards 72 and those of the prior art is the presence of a plurality of cue apertures 92. In the particular embodiment illustrated, the cue apertures 92 are shown to be round and sized to receive in a slip fit manner a first portion 76a of the cue member 76.

Another difference concerns the presence of a plurality of terminal base recesses 96 in the circuit board 72a. The terminal base recesses 96 are shaped and sized to receive the base portion 98 of an associated one of the terminals 74. In the embodiment illustrated, the terminal base recesses 96 are square shaped, having a depth of about 5 mm (0.2 inches). Those skilled in the art will understand that the terminal base recesses 96 may be shaped and/or sized differently so as to prevent the incorrect assembly of the junction box 16. The terminals 74 extend upwardly from the terminal base recesses 96 in the circuit board 72a and terminate at a terminal post 100 that is configured to be electrically coupled to a power cable, such as a battery cable. Two of the terminals 74 (i.e., terminals 74b and 74c) are illustrated to be held in place by electrical contacts 86 that are coupled to the upper most circuit board 72 and which extend over the base portion 98, while the remaining terminal 74 (i.e., terminal 74a) is held in place by virtue of one or more retaining tabs 106 (FIG. 6) that are molded or otherwise formed into the junction box housing 70.

The junction box housing 70 is a unitarily formed, injection molded structure that includes a plurality of electrical component recesses 110, a plurality of bolt bosses 112, a plurality of upper cue apertures 114, a plurality of abutting walls 116 and a plurality of latch members 48. Each of the electrical component recesses 110 is configured to receive an associated one of the electrical components. The construction and use of the electrical component recesses 110 is conventional and well within the level of skill in the art and as such, a detailed discussion of their construction need not be provided. With additional reference to FIG. 13, the bolt bosses 112 include a circumferentially extending flange 120 that surrounds a bolt aperture 122. The inside diameter of the circumferentially extending flange 120 is sized to receive a bolt 124 that couples an associated wire harness 24 to the junction box 14 as well as the tool (not shown), such as a conventional socket wrench, for rotating the bolt 124. The bolt aperture 122 is sized to receive the bolt 124.

In the embodiment illustrated, each of the upper cue apertures 114 is positioned proximate an associated one of the circumferentially extending flanges 120 and has a first portion 114a having a first diameter and a second portion 114b having a second diameter that is sized smaller than the first portion 114a. The first and second portions 114a and 114b of the upper cue apertures 114 are sized to receive in a slip-fit manner a second and third portion 76b and 76c, respectively, of the cue member 76. The second portion 76b of the cue member 76 is coupled on opposite sides to the first and third portions 76a and 76c and is relatively larger in diameter than the remaining portions of the cue member 76.

Accordingly, when the junction box 14 is assembled, the cue member 76 is slidably engaged to the circuit boards 72 and the junction box housing 70. The cue member 76 is limited in downward motion by an interference between the second portion 76b of the cue member 76 and the uppermost circuit board 72 as the second portion 76b of the cue member 76 is larger in diameter than the cue aperture 92 in the circuit boards 72. Similarly, upward motion of the cue member 76 is limited by an interference between the second portion 76b of the cue member 76 and the second portion 114b of the upper cue aperture 114 as the second portion 76b of the cue member 76 is larger in diameter than the second portion 114b of the upper cue aperture 114.

The junction box housing 70 is overlaid onto the circuit boards 72 and the cue members 76 and is fixedly coupled, to the circuit board 72a by virtue of a plurality of conventional snap-lock fittings 130 (FIG. 1), the construction and use of which is well known in the art. Briefly, the snap-lock fittings 130 have elements, such as tabs (not specifically shown) and recesses (not specifically shown), that are integrally formed into both the junction box housing 70 and the circuit board 72a. The snap-lock fittings 130 fixedly engage one another when the junction box housing 70 and the circuit board 72a are slidably engaged to one another to thereby inhibit the junction box 14 from separating. With the junction box housing 70 and the circuit board 72a fixedly coupled to one another, the electrical contacts 86 of the circuit boards 72 extend into or terminate proximate the electrical component recesses 110 in the junction box housing 70 that are configured to receive the electrical components 80.

As discussed above, modern high-volume vehicle manufacturing techniques favor the delivery of highly assembled modules or components to the vehicle assembly line so as to facilitate the efficient and reliable assembly of vehicles. In this regard, it is desired that all of the electrical components 80 be coupled to the junction box 14 prior to its delivery to the vehicle assembly line for the installation to a vehicle. The various fuses 80b and relays 80c, etc. that are disposed in the electrical component recess 110 and coupled to the electrical contacts 86 of the circuit boards 72 are firmly fixed to the junction box housing 70 and as such, there is little risk that they will dislodge and fall out during the transport and installation of the junction box 14.

With reference to FIGS. 5 through 8, the terminal fuse 80a is illustrated to drop over the terminals 74 and as such, is not firmly fixed to the junction box housing 70 in the manner that secures the other electrical components 80 to the junction box housing 70. In particular, the terminal fuse 80a is shown to have a pair of terminal apertures 140 that are sized to fit over the terminal posts 100 of the terminals 74a and 74b. The terminal fuse 80a is illustrated to be a Model 289125 fast acting blade terminal fuse commercially manufactured by Littlefuse, Inc. of Des Plaines, Ill. As will be appreciated, this particular terminal fuse is merely exemplary and it is contemplated that any appropriate blade terminal fuse may be employed.

The clip structure 78 is operable for preventing the terminal fuse 80a from dislodging from the junction box housing 70. In the embodiment illustrated, the clip structure 78 is unitarily formed with the junction box housing 70, but those skilled in the art will understand that the clip structure 78 may also be a discrete structure that is coupled to the junction box housing 70 prior to, concurrently with, or after the terminal fuse 80a as been positioned over the terminals 74. In the particular example provided, the clip structure 78 includes a pair of fingers 144 that are resiliently coupled to the junction box housing 70 on opposite sides of a terminal fuse recess 146. Each of the fingers 144 includes a tapered lead 150 and terminates abruptly at a trailing edge 152. When the terminal fuse 80a is placed over the terminal posts 100 of the terminals 74 and pushed into the terminal fuse recess 146, the fingers 144 deflect outwardly to permit the terminal fuse 80a to pass beyond the trailing edge 152 of the fingers 144 and fully seat into the terminal fuse recess 146. When the terminal fuse 80a passes beyond the trailing edge 152 of the fingers 144, the fingers 144 pivot, by virtue of their resilient connection to the junction box housing 70, toward one another such that at least a portion of each of the trailing edges 152 is positioned over the terminal fuse 80a to thereby inhibit the terminal fuse 80a from dropping off the terminal posts 100. It should be noted that it is not necessary that the clip structure 78 push or position the terminal fuse 80a into contact with the terminals 74. Rather, the subsequent coupling of an associated cable to each of the terminal posts 100, as will be discussed in detail, below, will generate a clamping force that will push the blades 156 of the terminal fuse 80a into electrical contact with the terminals 74.

Figure 9:
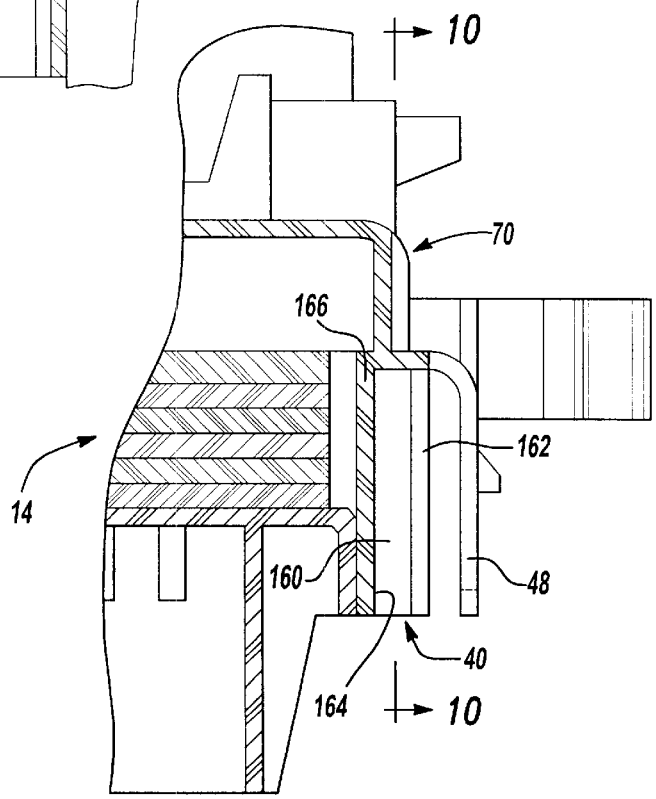
FIG. 9 is a sectional view taken the line 9—9 of FIG. 5 and illustrating the construction of an alignment tab formed on the junction box.
Figure 10:
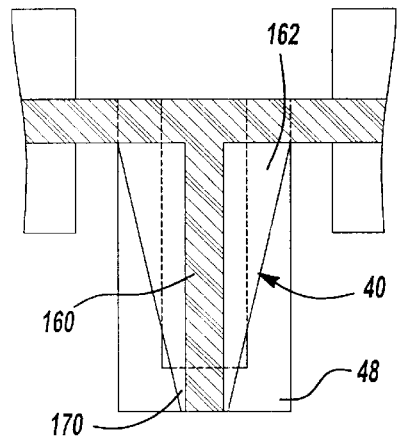
FIG. 10 is a sectional view taken along the line 10—10 of FIG. 9.

With reference to FIGS. 5, 9 and 10, the alignment tabs 40 are illustrated to include a stem member 160 and a flange member 162. The stem member 160 is fixedly coupled to and extends perpendicularly from an exterior surface 164 of the outer wall 166 of the junction box housing 70. The flange member 162 is coupled to the opposite end of the stem member 160 and extends generally perpendicular thereto in a direction that is generally parallel to the exterior surface 164 of the outer wall 166. The flange member 162 is tapered over at least one-half its length and preferably over substantially all of its length. Also preferably, the flange member 162 is tapered such that a narrowest point of its leading edge 170 has a width that is about equal to the width of the stem member 160. The widest part of the flange member 162 is slightly smaller than the first portion 66 of the tab aperture 62. The flange member 162 and the stem member 160 are sized to fit into the first and second portions 66 and 68, respectfully, of the tab aperture 62.

Figure 11:
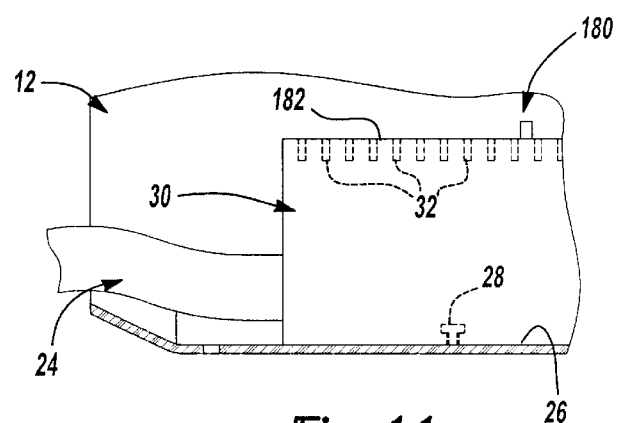
FIG. 11 is a section view taken through the shroud and illustrating the connector end of a wire harness coupled to the shroud.
Figure 12:
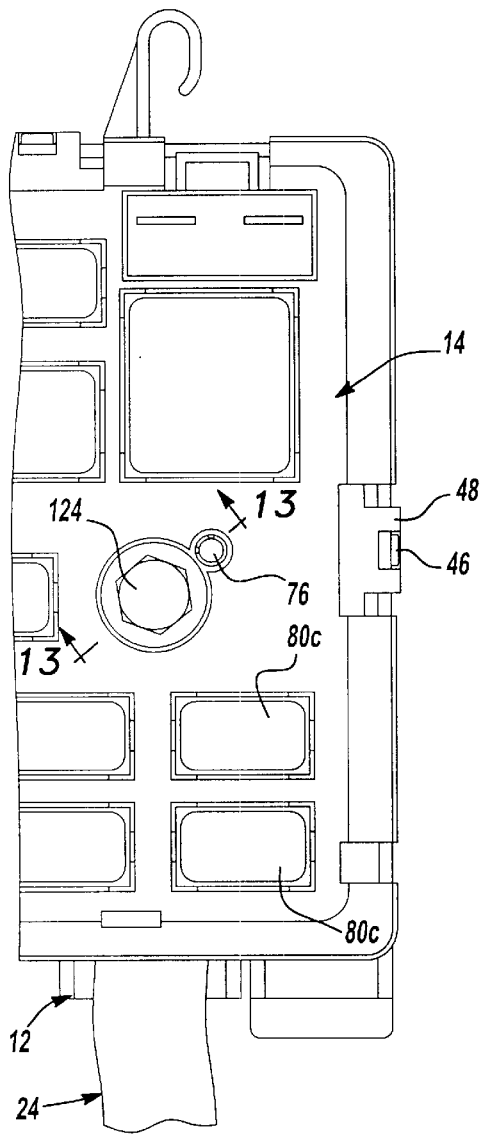
FIG. 12 is a top view of a portion of the junction box assembly.

With reference to FIG. 11, the wire harnesses 24 are coupled to the shroud 12 such that the connector end 30 of each wire harness 24 is coupled to a wire harness retaining tab 28. The wire harness retaining tab, in conjunction with the sidewalls 20 of the wire harness aperture 22, operably position each of the connector ends 30 into a predetermined position and orientation that permits the junction box 14 to be coupled to the wire harnesses 24 with relatively little effort.

The connector end 30 is illustrated to include a contact 180 that extends upwardly from a top face 182 of the connector end 30. In the particular embodiment illustrated, the contact 180 is a round protrusion having a diameter that is about equal to the diameter of the first portion 76a of the cue member 76.

Figure 14:
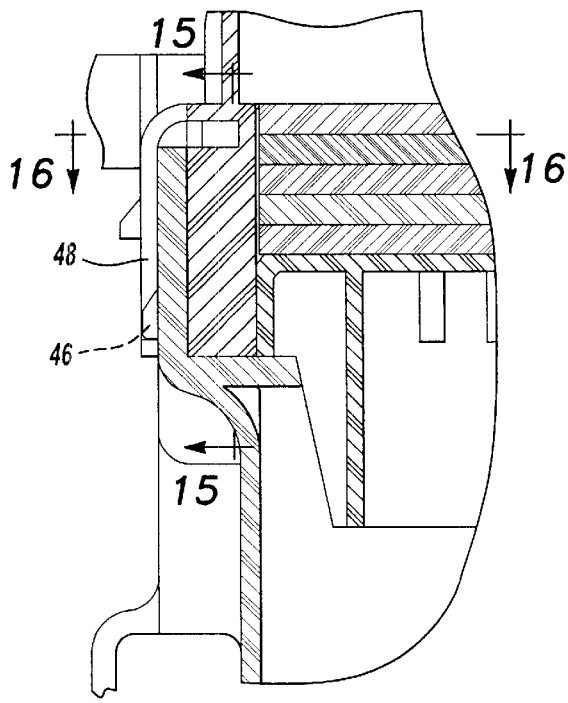
FIG. 14 is a sectional view illustrating the junction box as coupled to the shroud.
Figure 15:
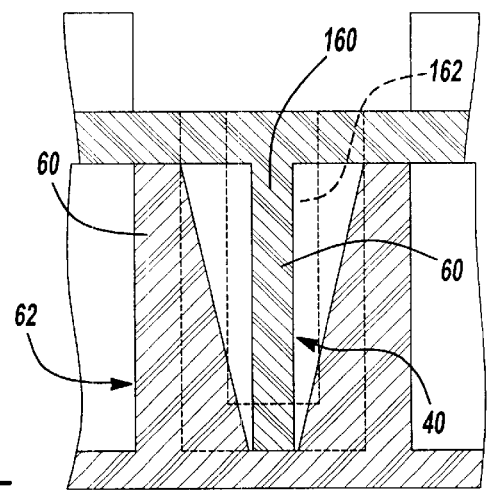
FIG. 15 is a section view taken along the line 15—15 of FIG. 14.
Figure 16:
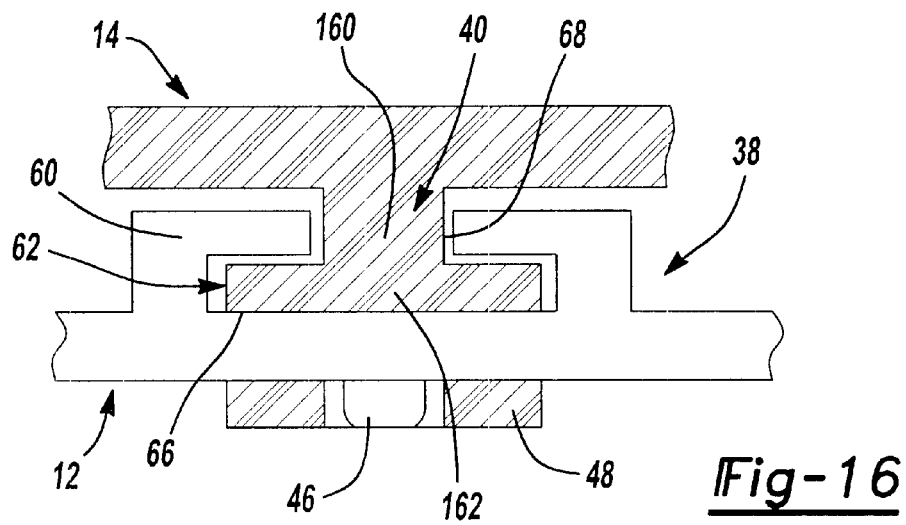
FIG. 16 is a section view taken along the line 16—16 of FIG. 14.

With the wire harnesses 24 coupled to the shroud 12, the junction box housing 70 is positioned relative to the cavity 34 in the shroud 12 such that the alignment tabs 40 are aligned to the tab receiving slots 38 as illustrated in FIGS. 14 through 16. Due to the tapered configuration of the flange members 162, the junction box housing 70 need not be precisely positioned relative to the shroud 12. Rather, the highly tapered alignment tabs 40 permit the junction box housing 70 to be assembled to the shroud 12 even when the junction box housing 70 is severely skewed to the shroud 12. In the particular embodiment illustrated, the flange members 162 are tapered over substantially their entire length, permitting the assembler to start assembling the junction box housing 70 to the shroud 12 by aligning the alignment tabs 40 on one side of the junction box housing 70 to the tab receiving slots 38 in the shroud 12. In contrast, the non-tapered tabs that are used in other junction box assembly designs do not permit the junction box housing to be skewed to the shroud to the same extent. As will be apparent to those skilled in the art, the ability to skew the junction box housing 70 to the shroud 12 when aligning and engaging the alignment tabs 40 and the tab receiving slots 38 greatly improves the ability of the assembler to assemble the junction box assembly 10 in a high-volume vehicle assembly operation.

Figure 13:
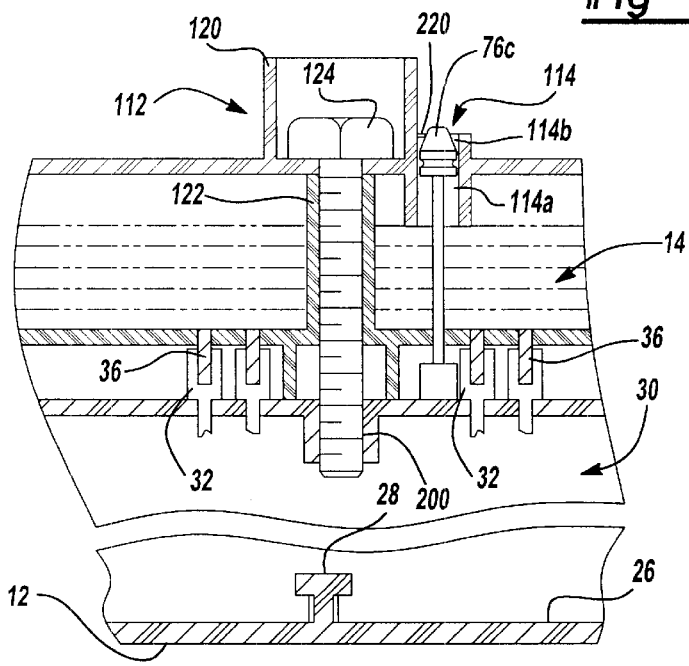
FIG. 13 is a section view through a portion of the junction box assembly taken along the line 13—13 of FIG. 12.

With additional reference to FIGS. 11 through 13, when the alignment tabs 40 have been aligned to the tab receiving slots 38, the junction box 14 is pushed into the shroud 12 so that the electrical contacts 36 that extend from the junction box 14 slidably engage the mating electrical contacts 32 in the connector end 30. Typically, the assembler will push the junction box 14 into the shroud 12 until the U-shaped latch members 48 that are resiliently coupled to the junction box housing 70 slip over the tapered edge 50 of the retaining tabs 46 and engage the abutting face 52 of the retaining tabs 46 in a manner that is well known in the art. Thereafter, the bolts 124 are inserted through the junction box 14 and threadably engaged to threaded apertures 200 in the connector ends 30. The bolts 124 exert a clamping force which is intended to retain the wire harnesses 24 to the junction box 14 such that electric continuity will be maintained between the electrical contacts 36 in the junction box 14 and the mating electrical contacts 32 in the connector ends 30.

As the circuit boards 72 and the junction box housing 70 are typically somewhat flexible, reliable electrical connection between the electrical contacts 36 in the junction box 14 and the mating electrical contacts 32 in the connector ends 30 is not necessarily made when the latch members 48 are engaged to the retaining tabs 46 and the bolts 124 are tightened. The cue member 76, however, provides a visual reference which permits one to readily identify the state of engagement between the electrical contacts 36 in the junction box 14 and the mating electrical contacts 32 in the connector ends 30.

Figure 17:
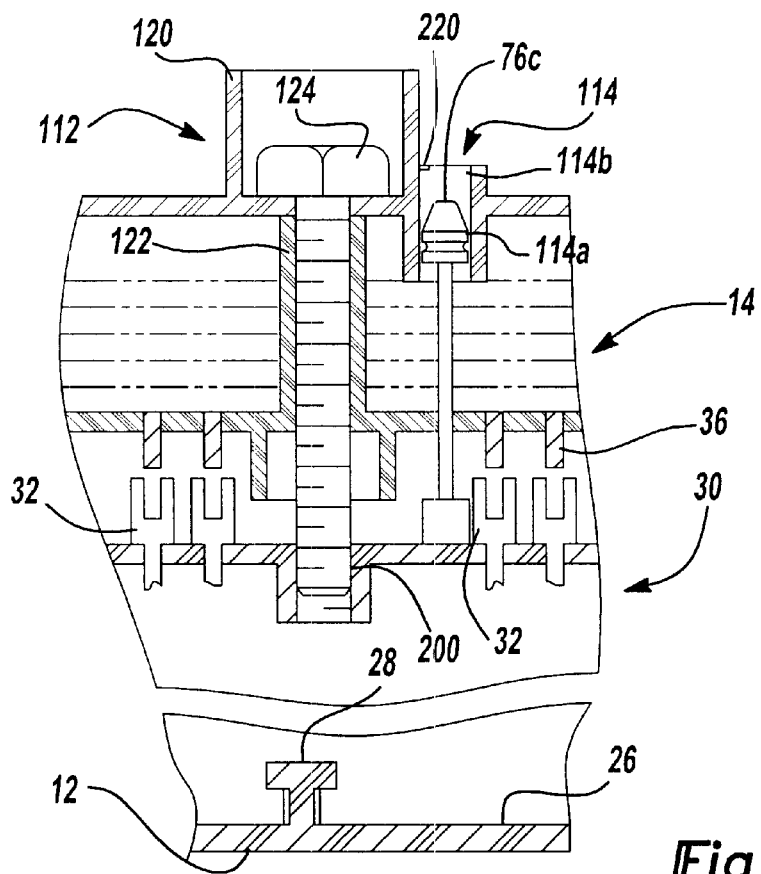
FIG. 17 is a section view similar to that of FIG. 13 but illustrating the electrical contacts of the junction box in a disengaged condition.

With reference to FIGS. 13 and 17, an end of the cue member 76 contacts the contact 180 when the junction box 14 and the shroud 12 are coupled to one another. The contact 180 is such that it will push the cue member 76 upwards in response to the coupling of the electrical contacts 32 in its associated connector end 30 to the electrical contacts 36 of the junction box 14. The contact 180 and cue member 76 are sized such that no portion of the cue member 76 will extend upwards above the upper surface 220 of the junction box housing 70 unless the electrical contacts 36 in the junction box 14 are engaged to the mating electrical contacts 32 in the connector ends 30 in a manner that provides reliable electrical connection. Those skilled in the art will appreciate that the amount by which the cue member 76 extends from the upper surface 220 of the junction box housing 70 is indicative of an amount by which the electrical contacts 36 in the junction box 14 have been slidingly engaged to the mating electrical contacts 32 of the connector ends 30.

Figure 6:
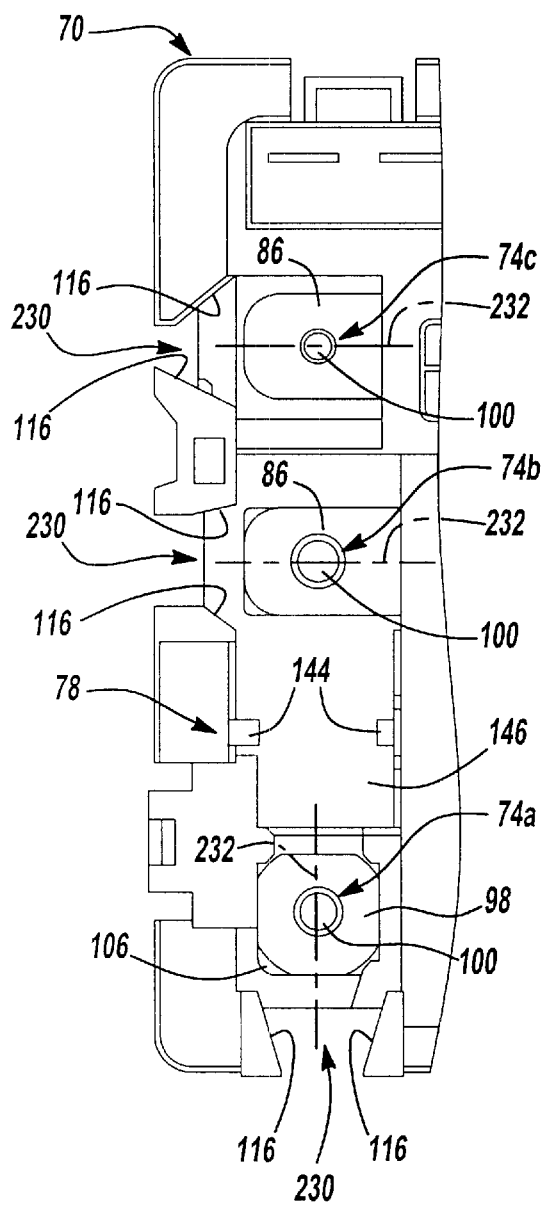
FIG. 6 is a top view of a portion of the junction box.
Figure 7:
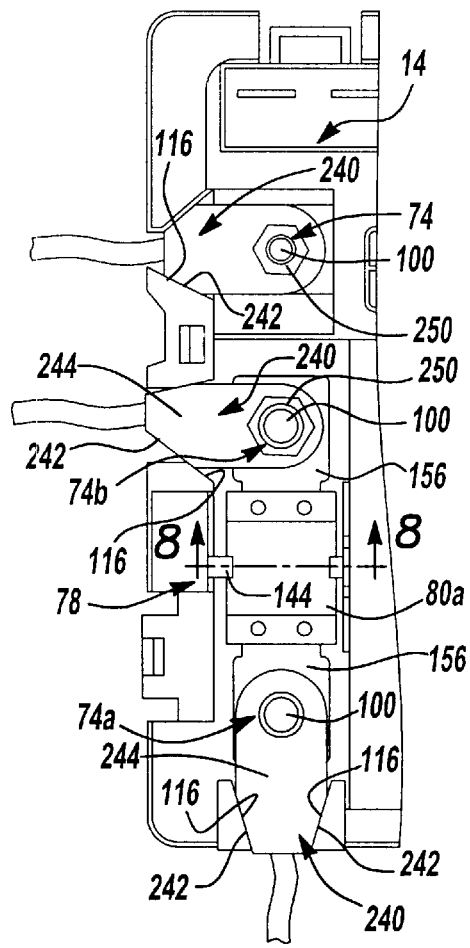
FIG. 7 is a top view similar to that of FIG. 6 but illustrating a plurality of wire harness and the terminal fuse as coupled to the junction box.
Figure 8:
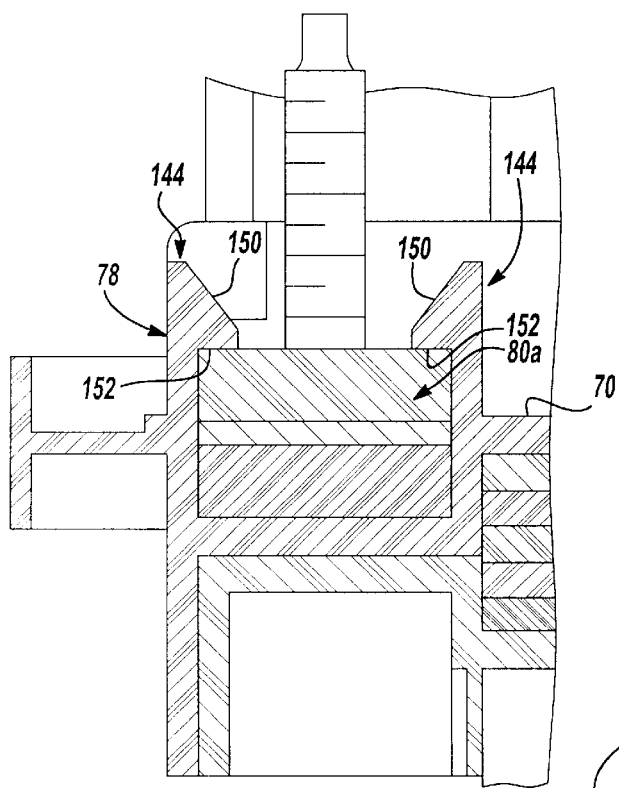
FIG. 8 is a sectional view taken along the line 8—8 of FIG. 7.

As illustrated in FIGS. 6 and 7, the junction box housing 70 is formed such that a terminal recess 230 is formed proximate each of the terminals 74. The terminal recess 230 is configured to receive an associated wire, wire harness or cable (e.g., a battery cable) and includes a pair of abutting walls 116 that are configured to abut their associated cable to inhibit the cable from rotating relative to the terminal recess 230. In the embodiment illustrated, each pair of abutting walls 116 is illustrated to taper inwardly toward a centerline 232 of its terminal recess 230 and away from its terminal 74. Further, each pair of abutting walls 116 is illustrated to taper in a manner that is distinct from the manner in which the other pairs of abutting walls 116 taper. Configuration of the abutting walls 116 in this manner may not necessarily prevent any one of the cables 240 from being electrically coupled to an incorrect terminal 74 but will prevent two or more of the cables 240 from being coupled to an incorrect terminal 74 due to interferences between the pair of abutting walls 116 and the walls 242 of the terminal connector 244 on the cable 240.

In coupling the cables 240 to the terminals 74, the terminal connectors 244 are placed over the terminal posts 100 and a threaded fastener 250 is threadably engaged to each of the terminal posts 100 to generate a clamping force that electrically couples the terminal posts 100 to the terminal connectors 244. Additionally, the clamping force that is produced ensures that the terminal blades 156 of the terminal fuse 80a are in electrical contact with the terminals 74a and 74b.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In, addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A junction box assembly comprising:
   a shroud that is configured for housing an end connector of a wire harness;
   a junction box that is configured to be received at least partially into the shroud, the junction box including a junction box housing, a pair of terminals, a fuse, a clip structure, a plurality of electrical contacts and a cue member, the pair of terminals being coupled to the junction box housing and extending therefrom, each of the terminals having a terminal post that is adapted for electrical connection to an associated one of the wire harnesses, the fuse being disposed over the terminals and not being fixedly coupled thereto, the fuse being configured to electrically couple the terminals when the wire harnesses are secured to the terminals, the clip structure being coupled to the junction box housing, the clip structure engaging the fuse to inhibit the fuse from disengaging the terminals when the wire harnesses are not coupled to the terminal posts, the junction box housing having a first side and a second side opposite the first side, the electrical contacts extending outwardly from the first side and being configured to engage a plurality of mating electrical contacts in the connector end, the electrical contacts being configured to be slidable relative to the mating electrical contacts between a disengaged condition and an engaged condition, the cue member being disposed in the junction box housing and slidable between a first condition and a second condition, the cue member sliding from the first condition to the second condition in response to movement of the electrical contacts from the disengaged condition to the engaged condition, the cue member extending outwardly from the second side to provide a visual indication of an electrical connection between the connector end and the junction box when the electrical contacts are in the engaged condition;
   a plurality of tab receiving slots formed into one of the shroud and the junction box, the tab receiving slots defining an aperture with having a T-shaped cross section in a direction taken perpendicular to a longitudinal axis of the aperture; and
   a plurality of alignment tabs coupled to the other one of the shroud and the junction box, the alignment tabs having a longitudinal axis, a stem and a flange, the stem and the flange being arranged such that a cross section taken through the alignment tab in a direction perpendicular to the longitudinal axis of the alignment tab is generally T-shaped and sized to fit in the aperture of a corresponding one of the tab receiving slots, the flange being tapered over at least one half of its length.

2. A junction box assembly comprising:
   a shroud;
   a junction box that is configured to be received at least partially into the shroud along an insertion axis;
   a plurality of tab receiving slots formed into one of the shroud and the junction box, the tab receiving slots defining an aperture having a T-shaped cross section in a direction taken perpendicular to a longitudinal axis of the aperture; and
   a plurality of alignment tabs coupled to the other one of the shroud and the junction box, the alignment tabs having a longitudinal axis, which is oriented generally parallel to the insertion axis, the alignments tabs also having a stem and a flange, the stem and the flange being arranged such that a cross section taken through the alignment tab in a direction perpendicular to the longitudinal axis of the alignment tab is generally T-shaped and sized to fit in the aperture of a corresponding one of the tab receiving slots, the flange being tapered over at least one half of its length;
   wherein each of the tab receiving slots includes a flange receiving portion that is configured to receive the flange of an associated alignment tab and wherein the flange receiving portions are tapered over at least one half of their length in an amount that is equal to that of the flange of the associated alignment tab;
   whereby the flanges and the tab receiving portions cooperate to guide and align the junction box to the shroud.

3. The junction box assembly of claim 2, wherein the flange is tapered over substantially its entire length.

4. The junction box assembly of claim 2, wherein a distal end of the flange has a width that is about equal to a width of the stem.

5. The junction box assembly of claim 2, further comprising a locking lug and a latch, the locking lug being coupled to the one of the shroud and the junction box, the latch being resiliently coupled to the other one of the shroud and the junction box, the latch being operable for engaging the locking lug to fixedly but removably couple the shroud and the junction box.

6. The junction box assembly of claim 2, wherein the aperture is configured to conform to a shape of the flange.

7. The junction box assembly of claim 2, further comprising:
   a plurality of latch members, each latch member being coupled to and extending from the other one of the shroud and the junction box and overlying an associated flange; and a plurality of locking lugs coupled to the one of the shroud and the junction box, each locking lug being configured to engage an associated one of the latch members to thereby inhibit the junction box from being withdrawn from the shroud.

8. An electrical junction box assembly comprising:

a junction box housing;

at least one terminal coupled to the junction box housing and extending therefrom, each terminal being adapted for electrical connection to an associated cable assembly;

wherein the junction box housing includes a terminal recess for each terminal, each terminal recess being configured to house an associated one of the terminals, each terminal recess including a pair of abutting walls that are configured to abut the associated cable assembly to inhibit the associated cable assembly from rotating relative to the terminal recess; and wherein at least a portion of each of the abutting walls tapers inwardly toward a centerline of its terminal recess and away from its associated terminal.

9. The electrical junction box assembly of claim 8, wherein the abutting walls of a first one of the terminal recesses tapers in a manner that is distinct from a manner in which the other terminal recess tapers.

10. The electrical junction box assembly of claim 8, further comprising:

a fuse disposed over two of the terminals and not being fixedly coupled thereto, the fuse being configured to electrically couple the two terminals when the cable assemblies are secured to the two terminals; and a clip structure coupled to the junction box housing, the clip structure engaging the fuse to inhibit the fuse from disengaging the two terminals when the cable assemblies are not coupled to the two terminals.

11. The electrical junction box assembly of claim 10, wherein the junction box housing and the clip structure are unitarily formed.

12. The electrical junction box assembly of claim 11, wherein the clip structure includes a pair of fingers that are coupled to the junction box housing, the fingers being resiliently biased towards one another.

13. The electrical junction box assembly of claim 8, wherein each terminal recess is configured differently so as to prevent both of the cable assemblies from being coupled to terminals incorrectly.

14. The electrical junction box assembly of claim 8, wherein each terminal includes a terminal post.

15. A junction box assembly comprising:

a shroud that is configured for housing an end connector of a wire harness;

a junction box that is configured to be releasably coupled to the shroud, the junction box including a junction box housing, a plurality of electrical contacts and a cue member, the junction box housing having a first side and a second side opposite the first side, the electrical contacts extending outwardly from the first side and being configured to engage a plurality of mating electrical contacts in the connector end, the electrical contacts being configured to be slidable relative to the mating electrical contacts between a disengaged condition and an engaged condition, the cue member being disposed in the junction box housing and slidable between a first condition and a second condition, the cue member sliding from the first condition to the second condition in response to movement of the electrical contacts from the disengaged condition to the engaged condition, the cue member extending outwardly from the second side to provide a visual indication of an electrical connection between the connector end and the junction box when the electrical contacts are in the engaged condition.

16. The junction box assembly of claim 15, wherein the cue member is disposed below the second side when the electrical contacts are in the disengaged condition.

17. The junction box assembly of claim 15, wherein the cue member extends from the second side when the electrical contacts are in the engaged condition.

18. The junction box assembly of claim 15, wherein an inward end of the cue member is configured to contact the end connector.

19. The junction box assembly of claim 15, wherein the cue member is white in color.

20. The junction box assembly of claim 15, wherein the cue member is a stepped pin having a collar portion that engages a portion of the junction box housing to prevent the cue member from being pushed completely through the junction box housing.

* * * * *